May 23, 1961 D. D. CHRISTENSEN ET AL 2,985,867

MULTISTABLE MAGNETIC CORE SHIFT REGISTER

Filed May 20, 1957

3 Sheets-Sheet 2

May 23, 1961 D. D. CHRISTENSEN ET AL 2,985,867

MULTISTABLE MAGNETIC CORE SHIFT REGISTER

Filed May 20, 1957

3 Sheets-Sheet 3

United States Patent Office 2,985,867
Patented May 23, 1961

2,985,867

MULTISTABLE MAGNETIC CORE SHIFT REGISTER

Donald D. Christensen, Sun Valley, Calif., John D. Goodell, St. Paul, Minn., Kenneth H. Gutz, Clearwater, Fla., and Edward J. Wendt, Lake Elmo, Minn., assignors to International Business Machines Corporation, New York, N.Y., a corporation of New York Filed May 20, 1957, Ser. No. 660,215

8 Claims. (Cl. 340—174)

This invention relates to circuit devices which employ magnetic elements capable of being caused to assume more than two stable states of magnetic retentivity, representative of different information values, in response to the application of quantified magnetizing impulses and is directed in particular to register circuitry employing multistable cores of this type as storage elements wherein quantified magnetizing impulses are applied to and transmitted between the multistable storage cores under the control of further magnetic core switching elements.

Magnetic core storage and logical switching elements have been successfully employed in a large number of the present day commercial computing and data handling systems which utilize the binary notation both in representing and processing information. Such systems have generally utilized only the two limiting states of flux remanence realizable in magnetic cores, in representing binary information. However, it has been demonstrated that it is also possible to cause magnetic cores to assume a plurality of stable states intermediate the two limiting states and such cores when operated in this manner have been termed multistable cores. Circuitry employing multistable cores is illustrated in the copending application, Serial No. 427,216, filed May 3, 1954, in behalf of Tenny Lode and assigned to the assignee of this application. In order to cause a magnetic core to assume these intermediate stable states it is necessary to apply to the core increments of magnetizing force which are quantified as to magnitude and duration so that each increment is effective when applied to cause only a partial reversal of flux domains in the core and, dependent upon the quantification, a predetermined number of such increments are required to drive the core from one limiting state to the other. By properly quantifying the input pulses such a core may be stepped from one limiting state to the other in nine steps and, when operated with quantified pulses of this nature, multistable cores are readily adapted to systems which employ the decimal notation in representing and processing information. The embodiments of the present invention herein disclosed and described are directed toward decimal notation systems, though, of course, it should be understood that the choice of the decimal system is for the purpose of illustration and in no way restricts the application of the invention to systems employing this particular arithmetic notation.

A principal object of the present invention is to provide an all magnetic core shift register.

A more specific object is to provide an all magnetic core decimal shift register.

These objects are achieved in a system employing multistable magnetic cores for storing decimal information wherein information is stored in and transferred from one core to the other under the control of core switching elements which are driven from one limiting condition to the other. Since the flux change effected in a magnetic element, upon the application of a coercive force sufficient to drive the core from one limiting state of flux remanence to a saturation condition in the opposite direction, is substantially constant, a winding linking a portion of the core in which such a flux change is effected may be utilized to cause to be applied to a multistable core a quantified increment of magnetomotive force. In the shifting register of the present invention the transfer of decimal information values from one multistable storage core to another is controlled by two series of alternate clock pulses. The clock pulses in the first series are effective to successively condition switching cores intermediate the storage cores in accordance with the value being transferred from one storage core to another. The clock pulses in the alternate series are effective to drive the switching cores, after they have been conditioned, from a remanent state in one direction to a saturation state in the other to thereby apply the proper number of quantified magnetizing impulses to the storage core into which information is being transferred.

Thus another object of the present invention is to provide a novel method of deriving quantified impulses for driving a multistable magnetic core.

A further object is to provide a circuit wherein a multistable magnetic core, employed to represent decimal information, is driven in a series of steps from a limiting state in one direction to a limiting state in the opposite direction by quantified impulses each of which is supplied by a magnetic core being switched from a limiting state in one direction to a saturation condition in the opposite direction.

Another object is to provide a circuit wherein the relatively constant flux change, effected in a core of magnetic material when it is driven from a limiting to a saturation condition, is utilized to develop a quantified driving pulse for a further magnetic core.

Other objects of the invention will be pointed out in the following description and claims and illustrated in the accompanying drawings, which disclose, by way of example, the principle of the invention and the best mode, which has been contemplated, of applying the principle.

Figure 1:
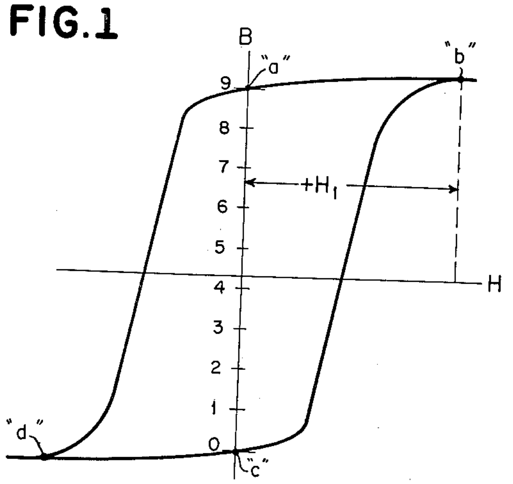
Fig. 1 is a representation of a hysteresis curve for a magnetic material such as may be used in practicing the present invention.

Magnetic materials having the property of low coercive force and high residual magnetism may be readily magnetized in either of two opposite directions and caused to assume limiting remanent states in either of these directions. A core fabricated of such materials may be caused to assume one or the other of these limiting states by energizing, with pulses of proper polarity, one or more windings on the core, and the particular state existing may be determined by a voltage pulse induced in other windings when an interrogation pulse is applied to the core; a relatively large voltage pulse being induced when the interrogation pulse causes a flux reversal in the core and only a small voltage being induced when the interrogation pulse does not effect a flux reversal. Since the two limiting states are stable and distinguishable, cores of this nature may be utilized in storing binary information, the limiting state in one direction being representative of a binary one and the limiting state in the other direction being representative of a binary zero. Fig. 1 depicts a hysteresis loop for a core material such as might be utilized for this purpose. Such cores are usually said to have substantially rectangular loop hysteresis loops but may be also characterized by the fact that the ratio of their magnetic flux density, when in a limiting remanent state, to their magnetic flux density, when in a saturated state in the same direction, is relatively high. The letters "*a*" and "*b*" in Fig. 1, respectively represent the limiting and saturation states in one direction and the letter "*c*" and "*d*," respectively, represent the limiting and saturation states in the other direction.

If, for example, limiting state "*a*" is the binary zero representing state and limiting "*c*" the binary one representing state, the application of an interrogation signal effective to cause a positive magnetizing force $+H_1$ to be applied to the core causes the segment "*cb*" to be traversed, this traversal represents a large flux change and a large signal output may be thus induced in an output winding when the core is initially storing a binary one. When the core is initially storing a binary zero, the application of such an interrogation pulse causes the segment "*ab*" to be traversed. Since the ratio of flux density at "*a*" to that at "*b*" is relatively high, the flux change then effected is relatively small as is the amplitude of the signal induced on the output winding.

Magnetic cores having a hysteresis loop, such as described above, are employed in the present invention and, in the description to follow, the coercive force, which is the force necessary to cause flux reversal, is considered to approximate a sharply defined constant under all conditions of magnetization. The magnetic state of the material, with reference to flux direction, remains essentially constant under the influence of magnetic forces less than the coercive force, and when the coercive force is exceeded slightly, the flux will be reversed at a rate determined by the electromotive force applied to the winding. The total change in flux density over a given time interval, during which flux reversal is being accomplished, is proportional to the integral of the applied electromotive force over the same time interval. This relationship is true, neglecting the losses in the winding, until all of the flux domains are reversed and the material begins to saturate.

It has been determined that the electromotive force need not be continuously applied during the aforementioned time interval but may be applied in the form of pulses with the total change in flux density being directly proportional to the number, magnitude and direction of the individual pulses. Thus, a predetermined number of such magnetizing impulses, having a particular constant amplitude and duration, are required to effect a change in the core from one limiting state to the other and different numbers of such pulses less than said predetermined number cause the core to assume different stable states of flux remanence intermediate the limiting states. Such pulses are termed quantified pulses and the number required to cause a predetermined change in flux density then depends upon the ability of the associated apparatus to accurately quantify the pulses applied and to detect the changes produced by them in the core and windings. Such a core may have a plurality of stable states intermediate the upper and lower limiting states and may be employed, therefore, to store other than binary information.

Figure 2:
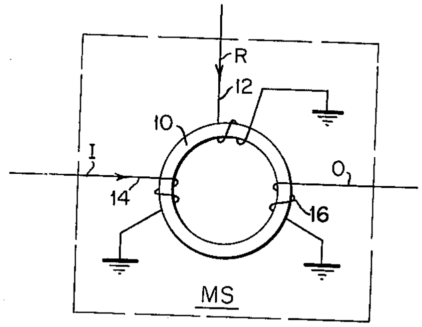
Fig. 2 is a diagrammatic showing of a core element and the windings thereon which are utilized to drive the element to different ones of a plurality of different stable states representative of decimal information values.
Figure 2A:
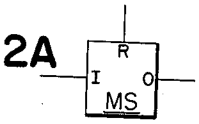
Fig. 2A is a symbolic representation of the core and windings shown in Fig. 2.

There is shown in Fig. 2 a multistable core 10 with the input, output and reset windings utilized in the shift register of the present invention. Initially a reset pulse is applied to a reset winding 12 on core 10 which causes current to flow in the direction indicated and thereby causes the core to be subjected to a magnetizing force which is sufficient to drive the core to saturation at "*d*." Upon termination of the reset pulse, the core 10 assumes the lower limiting state designated "*c*" in Fig. 1. Decimal information may then be entered in the core by applying pulses to an input winding 14. The magnitude and duration of the input pulses is such that each is effective to cause a quantified magnetizing impulse to be applied to the core 10, the quantification being such that nine such pulses are required to drive the core from limiting state "*c*" to limiting state "*a*," which states are the decimal zero and decimal nine representing states, respectively. The other information values in the decimal notation are represented by the stable states intermediate the limiting states, as is indicated in Fig. 1, and the multistable core may be caused to assume any one of these states by the application of the proper number of input pulses to winding 14. When it is desired to read out the information from core 10, a series of similarly quantified pulses are applied to input winding 14 and it can readily be seen that a number of such pulses, equal to the 9's complement of the decimal value stored in the core, is required to drive the core to limiting state "*a*." Thus, where a decimal value of two is stored in the core 10, the first seven pulses applied cause reversal of flux domains as the core is stepped to the limiting state "*a*." The remaining pulses in the series cause excursions along the saturation portion "*ab*" of the curve, which excursions involve flux changes which are small relative to those experienced as a result of the application of the first seven pulses in the series. The flux changes are sensed in an output winding 16 in which winding a significant output voltage is induced each time a quantified pulse is applied to winding 14 until the core reaches the limiting state "*a*." Thus, it may be seen that a series of discrete pulses, in number equal to the 9's complement of the decimal value stored in the core 10, is induced in winding 16 when a series of readout pulses is applied to core 10. Further it should be noted that similar output pulses are induced in winding 16 when input information is originally stored in core 10 and for this reason provision is made in the shifting register circuitry, later to be described, to prevent input information pulses from affecting the transfer of information values from one multistable core to another. Fig. 2A shows the box diagram symbol, designated MS which is utilized in the circuit of Fig. 5 to represent the multistable core circuit of Fig. 2, the letters I, O and R of Fig. 2A representing the similarly designated leads connected respectively to the input, output and reset windings in Fig. 2.

Figure 3:
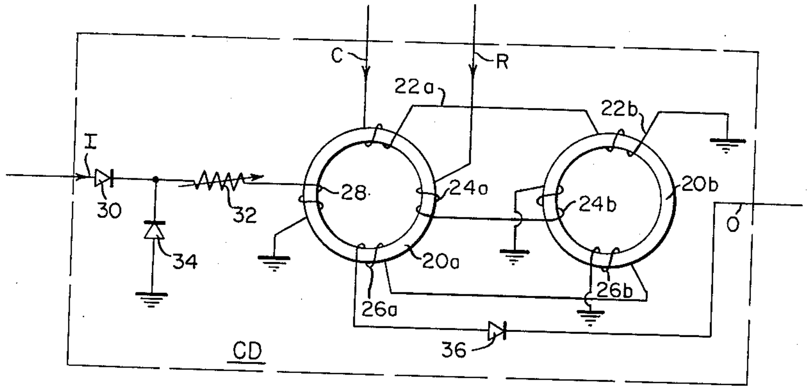
Fig. 3 is a diagrammatic representation of the magnetic cores and windings associated therewith which are employed to provide quantified impulses for driving the multistable storage cores in the shift register of the present invention.

There is shown in Fig. 3 the core driver circuit which is utilized to provide the quantified inputs for driving the multistable cores of the shift register of the present invention. This circuit includes a pair of cores designated 20*a* and 20*b*, which are linked by serially connected clock pulse windings 22*a* and 22*b* respectively; serially connected reset windings 24*a* and 24*b*, respectively; and serially connected output windings 26*a* and 26*b*, respectively. Though the cores in Fig. 3 are operated in a bistable mode and do not have the same operating characteristics as the multistable core of Fig. 2, the hysteresis loop of Fig. 1 is generally indicative of the magnetic characteristics of magnetic core material and may be used in explaining the operation of the circuit of Fig. 2. An input winding 28 is wound to embrace only core 20*a*. In operation both of the cores may be initially reset to the limiting state "c" by applying a pulse of sufficient magnitude and duration to either clock pulse windings 22*a* and 22*b* or reset windings 24*a* and 24*b*. The inputs to the circuit are applied to winding 28 through a serially connected diode 30 and variable resistor 32. The junction between diode 30 and resistor 32 is connected through a further diode 34 to a reference potential, here shown as ground, and the diodes serve to control the current flow between lead I and winding 28 and allow only pulses of positive polarity to be applied from input lead I to winding 28 and to prevent the transmission of pulses induced on winding 28 back to the input. The input pulses applied through this circuit to winding 28 are of sufficient magnitude to drive core 20*a* from limiting state "*c*" of Fig. 1 to a saturation condition in the opposite direction, which condition is represented at "*b*," and, upon termination of each input pulse, the core 20*a* assumes the upper limiting state at "*a*." Since winding 28 embraces only core 20*a*, the application of an input pulse switches this core only and core 20*b* remains in the lower limiting state at "*c*, the combined coupling provided by the clock, reset and output windings being ineffective to switch core 20*b*. It should be noted in this respect that the output windings 26*a* and 26*b* are wound in opposite senses on cores 20*a* and 20*b*, respectively, whereas the clock pulse windings 22*a* and 22*b* and the reset windings 24*a* and 24*b* are wound in the same sense on these cores. Output winding 26*a* senses the flux change effected in core 20*a* when an input pulse is applied to winding 28 but a diode 36 connected between this winding and output lead O prevents any output from being transmitted as a result of flux change in the direction from the lower limiting state at "*c*" to the upper to the upper limiting state at "*a*.

The information read into the circuit of Fig. 3 by applying an input pulse to winding 28 is read out by applying a clock pulse to a lead C and thereby causing energizing current to flow through windings 22*a* and 22*b*. The magnetomotive force then applied by winding 22*a* to core 20*a* is of sufficient magnitude and direction and of proper polarity to cause that core to experience a flux change represented in Fig. 1 by the curve "*ad*". Since core 20*b* is initially in limiting state "*c*," the flux change, experienced in this core, when winding 22*b* is energized, is represented by the lower saturation portion "*cd*" of the loop of Fig. 1. These flux changes in cores 20*a* and 20*b* are in the same direction but since they are sensed by windings 26*a* and 26*b*, which link cores 20*a* and 20*b* in opposite senses, the output voltages induced in these serially connected output windings are of opposite sense. However, since the flux change effected in core 20*a* is much larger than that experienced in core 20*b* a significant output is transmitted to output lead O.

When no input pulse has previously been applied to winding 28 and both cores 20*a* and 20*b* are initially in the lower limiting state at "*c*," each core is caused to experience a similar flux change, represented in Fig. 1 by the lower saturation portion "*cd*," and, since the output windings 26*a* and 26*b* link the cores in opposite senses, the small outputs then induced in these windings cancel each other and prevent any signal from being transmitted to lead O. The utilization of two cores connected in this manner thus provides a circuit having an extremely good signal to noise ratio.

The output pulse, delivered at O when the clock pulse windings 22*a* and 22*b* are energized after an input pulse has switched core 20*a* to the upper limiting state at "*a*" is quantified as to magnitude and duration and thus may be utilized to drive a multistable storage core. The quantification is due to the fact that the application to core 20*a* by winding 22*a* of a magnetomotive force of sufficient magnitude to completely switch the core causes a large flux reversal, which is represented in Fig. 1 by the segment "*ad*." The rate of flux reversal represented by this segment is substantially the same during switching caused by pulses of the same wave shape and any increase in the amplitude of the input pulse over that necessary to cause this segment to be traversed causes only a relatively slight flux change since the core has already reached a point of relatively high saturation. The quantification is also aided by the fact the core 20*b* is driven along the lower saturation portion of the curve of Fig. 1 an amount depending upon the amplitude of the energizing pulse applied to windings 22*a* and 22*b*. Thus, the output induced in both windings 26*a* and 26*b* increases in relatively the same manner as the amplitude of the clock pulse applied to windings 22*a* and 22*b* is increased, and since these windings produce voltages of opposite polarity, the output manifested at lead O is determined only by the magnitude and rate of the flux change effected in core 20*a* as it is switched along the segment "*ad*."

Figure 3A:
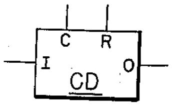
Fig. 3A is a symbolic representation of the magnetic core circuit of Fig. 3.

Fig. 3A is a box diagram representation of the circuit of Fig. 3, the letters I, O, C and R in Fig. 3A representing the similarly designated leads in Fig. 3. This box diagram designated CD is utilized in explaining the operation of the shift register of Fig. 5.

Figure 4:
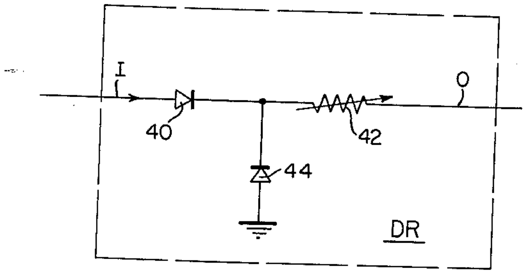
Fig. 4 is a diagrammatic showing of a diode circuit utilized in the shift register.
Figure 4A:
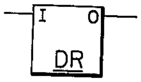
Fig. 4A is a symbolic representation of the circuit of Fig. 4.

There is shown in Fig. 4 a diode resistor circuit similar to that shown in Fig. 3. This circuit comprises a diode 40 and variable resistor 42 connected between an input lead I and an output lead O. A junction between diode 40 and resistor 42 is connected through a further diode 44 to ground. The circuit serves to control current flow between terminals I and O and allow only positive pulses to be transmitted from lead I to lead O and also serves to prevent the transmission of pulses in the opposite direction. This circuit is employed in the shift register in the transmission of pulses from the core driving circuits such as are shown in Fig. 3 to the multistable storage cores such as are shown in Fig. 2 and the variable resistor 42 may be set to control the amount of current caused to flow in the input windings 14 of the multistable cores 10 by the pulses developed on the output windings 26*a*, 26*b* of the core drivers. The circuit of Fig. 4 is represented in Fig. 5 by the box designated DR shown in Fig. 4A, the letters I and O in Fig. 4A representing corresponding leads similarly designated in Fig. 4.

Figure 5:
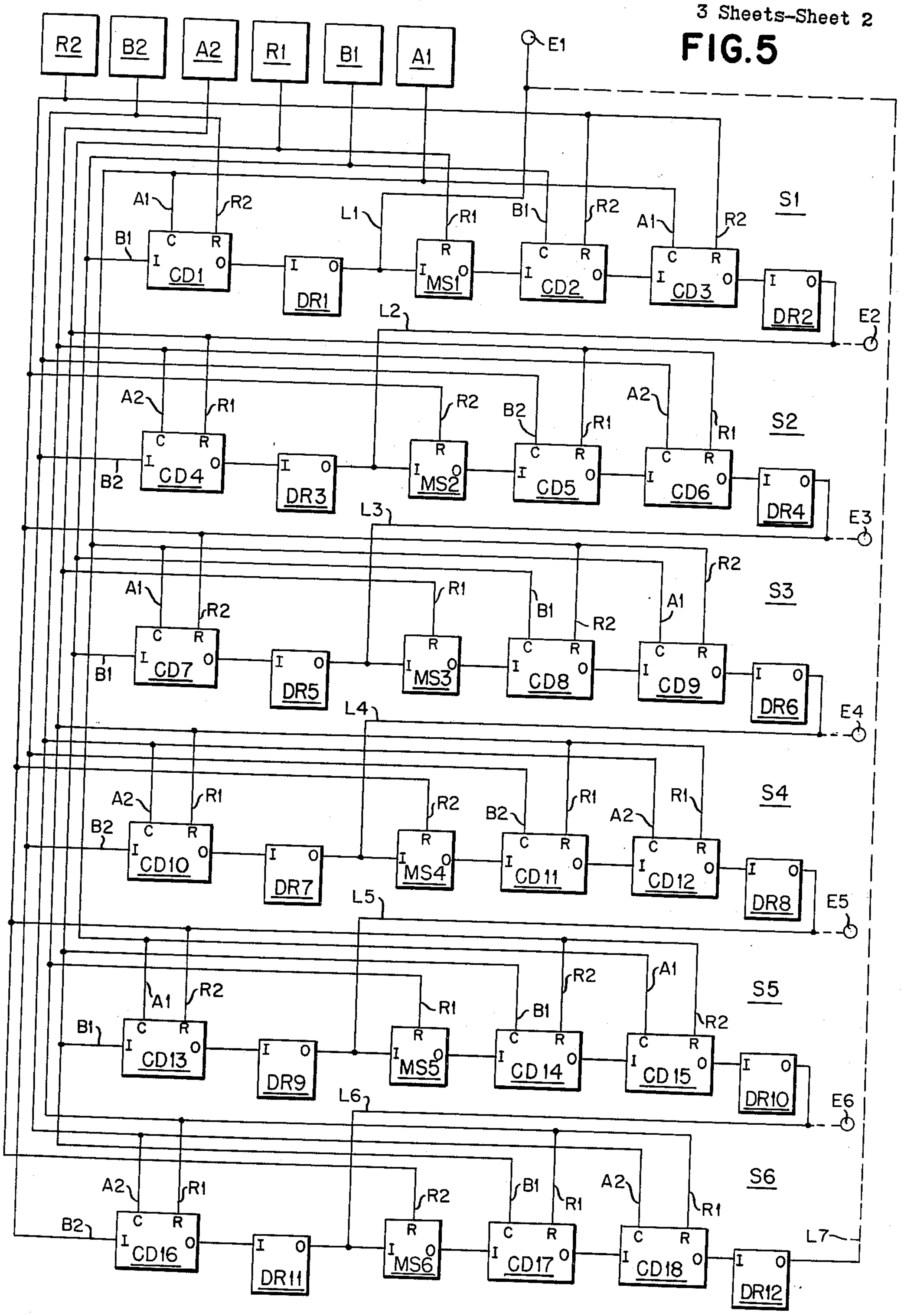
Fig. 5 is a diagrammatic showing of the shift register wherein the circuit components are represented by the symbolic representations of Figs. 2A, 3A and 4A.
Figure 6:
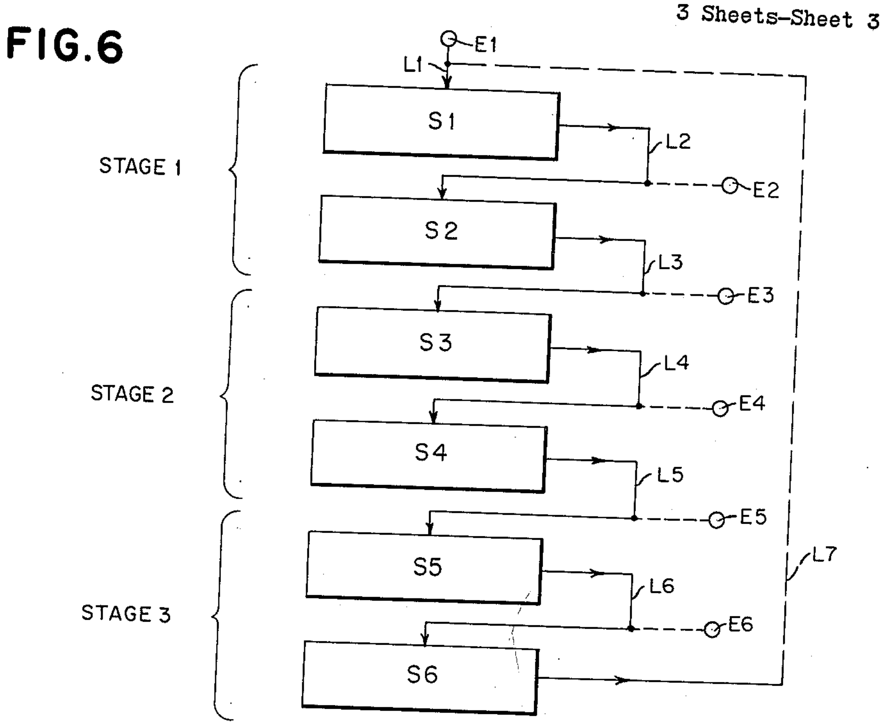
Fig. 6 is a box diagram of the shift register of Fig. 5.

There is shown in Fig. 5, in box diagram form, a shifting register constructed in accordance with the principles of the invention. The schematic drawing of Fig. 6 is a simplified showing indicating the number of storage units and the direction in which information is transferred from one to the other in the shift register. There are six storage units or stages, represented in Fig. 6 by the sequentially numbered boxes S1 through S6. Information is initially read into the unit by applying a series of quantified impulses at a terminal E1 thereby allowing the decimal information value, corresponding to the number of pulses applied, to be stored in storage unit S1. The storage units S1, S3 and S5 represent orders of decimal information and the units S2, S4 and S6 are intermediate storage units which are utilized in transferring information from one order storage unit to the next. The first step in shifting the information value, originally entered in unit S1, to the next order unit S3 is to shift this value, in 9's complement form, to intermediate unit S2. During the next operation, the originally entered value is transferred from unit S2 and entered in real form in the next order storage unit S3 and, at the same time, a second order of decimal information may be entered in the storage unit S1. The decimal values, thus stored in units S1 and S3, are then transferred to intermediate units S2 and S4 and thence to the storage units S3 and S5. During this latter operation a third order of decimal information may be entered in storage unit S1. This serial operation may be continued to enter a number of orders of decimal information determined by the number of stages in the storage register, which for purposes of illustration is here shown having three stages and is thus filled after the third decimal digit value is entered in unit S1. The register may be connected to circulate the orders of information thus entered. Such a connection is illustrated in Figs. 5 and 6 by a dotted line designated L7. Where such a connection is made the three information values may be continuously circulated, the unit S6 serving as an intermediate unit in transfer of information values from storage unit S5 to storage unit S1. Another possible mode of operation is to enter the three information digits in parallel to units S1, S2 and S3 by coincidently applying the proper numbers of quantified pulses to terminals E1, E3 and E5, respectively; or the three orders of information may be originally entered in parallel to the three intermediate units S2, S4 and S6 by coincidently applying to terminals E2, E4 and E6, respectively, numbers of pulses which represent the 9's complement of the three information values to be entered. Once the information values are entered, the digits may be circulated as above described, or, where the unit includes a larger number of stages, successively shifted from one stage to the next.

Figure 7:
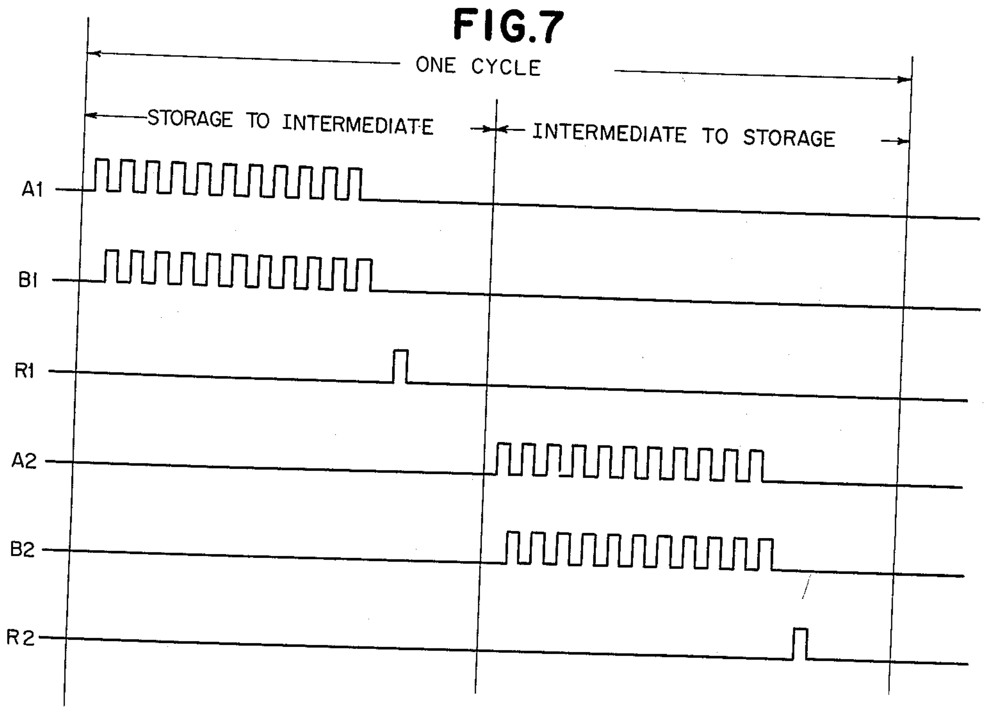
Fig. 7 is a timing diagram for depicting the sequence in which various series of clock pulses are applied to the shift register.

In operation, the shifting of information in the shift register, as shown in Fig. 5, is controlled by six pulse generators A1, B1, R1, A2, B2, R2, which deliver pulses during each cycle of operation with the timing indicated in Fig. 7. The pulse generators A1, B1 and R1 deliver their pulses during the first half of each cycle during which information may be transferred from storage order units S1, S3 and S5 to intermediate units S2, S4 and S6. Pulse generators A2, B2 and R2 deliver their pulses during the second half of each cycle during which information may be read out of the intermediate units S2, S4 and S6 and read into the order storage units S1, S3 and S5.

The information values are stored in the shift register of Fig. 5 in three order multistable core storage units designated MS1, MS2 and MS3 and three intermediate multistable core storage units MS2, MS4 and MS6, the box diagrams shown representing the core and winding structure shown in Fig. 2. The shifting of information values between the multistable units is controlled by a number of core driver circuits designated CD1, CD2 etc., each of which is constructed as is shown in Fig. 3. Consider that each of these units is initially in the reset condition, that is at limiting state "c" in Fig. 1, and that the first digit of decimal information has been read into the first storage unit MS1 by previously applying a series of quantified pulses, equal in number to the decimal digit to be stored, to terminal E1 which is connected to the input terminal of unit MS1. A transfer cycle may then be initiated by causing clock pulses, with the timing shown in Fig. 7, to be generated by sources A1, B1, R1, A2, B2 and R2. The pulses supplied by generators A1, B1, A2 and B2 are applied to the clock pulse entries C of various ones of the core drivers CD and are hereafter referred to as clock pulses. The pulses supplied by generators R1 and R2 are applied to reset entries R of certain core drivers CD and storage units MS, and are hereafter referred to as reset pulses. Each of the leads to the reset and clock pulse entries of the various components have associated therewith a designation indicating the pulses generator to which it is connected. Further, through for simplicity of illustration the schematic drawing of Fig. 5 shows the various clock and reset windings connected in parallel, all the windings driven by each pulse source are serially connected.

The first clock pulse applied, when a shifting cycle is initiated after a particular decimal value is entered in unit MS1, is the first in the series of eleven A1 clock pulses. This pulse is applied to driver units CD1 and CD3 in the first stage and to similar CD units in the third and fifth states. This clock pulse produces no output in any of these units, since, as was heretofore explained, these units produce outputs in response to the application of a clock pulse only when a pulse has been previously applied to their inputs. The next pulse applied is the first in the series of clock pulses supplied by pulse generator B1 and this pulse is fed as an input to the unit CD1 so that the next A1 clock pulse applied to that unit causes an output to be developed at its output lead O. Each of the remaining 10 clock pulses in the B1 series is similarly applied to the input of unit CD1 so that each of the remaining 9 pulses in the A1 series applied to this unit causes an output to be developed at the output of the unit. The output of unit CD1 is connected through a pulse control circuit DR1 (see Fig. 4) to the input of the first storage unit MS1, which is originally in a stable state representing the binary information value initially read into the register. The alternate application of B1 pulses to the input entry and A1 pulses to the clock entry of unit CD1 thus causes a series of 10 discrete quantified pulses to be applied to the input of multistable storage unit MS1. The number of outputs produced on the output lead O of storage unit MS1 is equal to the 9's complement of the decimal digit initially stored in this unit. These pulses are applied to the input of core driver unit CD2 which, as shown, has applied to its clock pulse entry the B1 clock pulses. The first input transmitted to this unit is produced by the second pulse in the A1 series which causes a stepping pulse to be applied to unit MS1. The first output at the output of unit CD2 is produced by the second clock pulse in the B1 series and this input is fed as an output to core driver CD3 rendering that core driver responsive to produce an output when the third in the series of A1 pulses is applied to its clock pulse entry. The output of unit CD3 is coupled through a unit DR2 to the input of the intermediate storage unit MS2. The number of pulses transmitted by units CD2 and CD3 to intermediate storage unit MS2 depends upon the number originally stored in storage unit MS1.

For example where four quantified input pulses, representative of the decimal digit four, are originally entered in unit MS1, the second, third, fourth, fifth and sixth A1 pulses applied to driver unit CD1 are effective to produce outputs which are, when applied to storage unit MS1, effective to drive that unit to saturation. Thus it is only these five pulses which are effective to cause inputs of sufficient magnitude to condition unit CD2 to be applied to the input of this unit. The second through sixth B1 pulses applied to the clock pulse entry of unit CD2 are thus effective to cause five discrete conditioning pulses to be applied to the input of unit CD3. The application of the third through seventh A1 pulses, each following one of the above mentioned B1 pulses, to the clock entry of unit CD3 cause five quantified pulses to be applied to the multistable core of intermediate storage unit MS2. The quantified magnetizing pulses which are then caused to be applied to the multistable core of unit MS2 are effective to cause that core to assume the intermediate stable state representative of a decimal value five, which value is the 9's complement of the decimal value four originally entered in the multistable core of storage unit MS1. After the last pulses in the A1 and B1 series are applied, pulse generator R1 is effective to apply a reset pulse to the reset winding of the multistable core of unit MS1 so that, after the first half of the shift cycle, this core stands at the lower limiting state "c" of Fig. 1, representing the value zero, and the multistable core of unit MS2 stands in the intermediate stable state representing the digit 5. The R1 reset pulse is also applied to drive units CD4, CD5 and CD6 to ensure that these drivers are properly reset prior to the transmission of information from intermediate unit MS2 to the next order storage unit MS3 during the second half of the shift cycle.

The A2 and B2 clock pulses are equal in number to and alternate in the same maner as the A1 and A2 pulses and these pulses are applied to corresponding core drives to effect the transfer of the 9's complement of the number stored in unit MS1 to the storage unit MS2. The shifting operation is initiated with the application of the first B2 pulse to the input of core driver CD4, and this and the following B2 pulses applied to this unit condition the unit to produce at its output ten discrete pulses in response to the second through eleventh A2 clock pulses which are applied to the clock pulse entry of the unit. The first four of these outputs are effective to drive the multistable core of intermediate unit MS2 to saturation, since the multistable core is set to saturate in nine pulses and five pulses have been previously applied during the transfer from storage unit MS1. These four pulses produce four output pulses which render core driver units CD5 and CD6 effective to apply, through pulse control circuit DR4, four quantified inputs to the input winding of the multistable core of storage unit MS3. This unit is thus caused to assume a stable state representative of a decimal four. During the second half of this first shift cycle it is also possible, coincident with the transfer of the decimal information value from unit MS2 to unit MS3, to enter a second digit of decimal information in the multistable core of unit MS1. This is accomplished, as before, by applying the proper number of quantified pulses at terminal E1 and the multistable core of unit MS1 will assume a stable state representative of the entered number since it was reset to the lower limiting state *"c"* at the end of the first half of the shift cycle by the pulse supplied by reset pulse generator R1.

After the last in the series of A2 and B2 pulses have been applied, pulse generator R2 supplies a reset pulse which is applied to reset the multistable core of unit MS2 so that at the end of the shift cycle this core is at zero; the multistable core of unit MS3 is in a stable state representing a four; and the multistable core of unit MS1 is in a stable state representative of the decimal value entered during the second half of the shift cycle. The R2 reset pulse is also applied to reset core driver units CD1, CD2 and CD3 anticipatory of the transfer of the decimal value from unit MS1 to MS2 during the first half of the next shift cycle; likewise core driver units CD7, CD8 and CD9 are reset by the pulse applied by pulse generator R2 anticipatory of the transfer of the decimal value from unit MS3 to unit MS4 during the first half of this next or second shift cycle.

The operation during the succeeding shift cycles is the same, the information values stored in the order storage units being transferred in 9's complement form to the intermediate units during the first half of each cycle and being transferred and again complemented during the latter half of each shift cycle. At the end of the second shift cycle, the decimal values, successively entered, stand in real form in the units MS1, MS3 and MS5 and these values may be continuously recirculated when a connection such as the line L7 is provided to feed the output of intermediate storage unit MS6 back to the input of order storage unit MS1.

Information may be initially read into the storage units M1, MS3 and MS5 in parallel by applying proper numbers of quantified pulses at terminals E1, E3 and E5. Where this mode of operation is practiced the shifting operations are the same as after three decimal values have been serially entered at input terminal E1 in the manner above described. Similarly information may be initially read in parallel into the intermediate storage units MS2, MS4 and MS6 by applying numbers of pulses representative of the 9's complements of the values to be entered, at terminals E2, E4 and E6. These values would be transferred to the next succeeding order storage units during the second half of the first shift cycle, after entry of the information. Thereafter the shifting follows the same pattern as described above.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a shift register circuit, first and second cores of magnetic material each capable of being caused to assume first and second limiting states of flux remanence and a plurality of states of flux remanence intermediate said limiting states, means responsive to flux changes in said first core for applying quantified magnetizing impulses to said second core comprising; a third core of magnetic material capable of assuming a limiting state of flux remanence in a first direction and of being driven to a flux saturation state in a second direction, first winding means on said third core coupled to winding means on said first core for causing said third core to assume said limiting state in said first direction in response to a flux change in said first core, second winding means on said third core for driving said third core from said limiting state in said first direction to said saturation state in said second direction, third winding means on said third core for producing a quantified output pulse when said third core is driven from said limiting to said saturation state, and input winding means on said second core coupled to said third winding means for applying to said second core a quantified magnetizing impulse in response to said quantified output pulse.

2. In a magnetic circuit, a first core of magnetic material capable of assuming first and second limiting states of flux remanence and a plurality of states of flux remanence intermediate said limiting states, means for applying quantified magnetizing pulses to said core for driving said core in step by step fashion from one of said limiting states to the other of said limiting states; said means comprising a second core of magnetic material capable of assuming a limiting state of flux remanence in one direction and of being driven to a flux saturation state in the opposite direction, a third core of magnetic material capable of assuming a limiting state of flux remanence in one direction and of being driven to a flux saturation state in the same direction, input winding means linking said second core alone for causing said second core to assume said limiting state in said one direction, winding means inductively associated with each of said second and third cores for producing flux changes in said second and third cores effective to drive said second core from said one limiting state in one direction to said saturation state in the opposite direction and to drive said third core from said limiting state in one direction to said saturation state in the same direction; and output winding means, inductively associated with said second and third cores in opposite senses with respect to said flux changes produced in said second and third cores, coupled to input winding means on said first core.

3. In a shifting register circuit, first and second multistable cores of magnetic material each capable of being caused to assume first and second limiting states of flux remanence and a plurality of intermediate states of flux remanence representative of information values, means for transferring information values from said first core to said second core comprising; third and fourth bistable cores of magnetic material each capable of assuming first and second states of flux remanence, an output winding on said first core, an input winding inductively associated with said third core coupled to said output winding on said first core, clock pulse winding means inductively associated with each of said third and fourth cores, an input winding on said second core, and winding means, including output windings of opposite senses of said third and fourth cores, coupled to said input winding on said second core.

4. In a shifting register circuit, first and second cores of magnetic material each capable of being caused to assume first and second limiting states of flux remanence and a plurality of intermediate states of flux remanence representative of information values, means for transferring information values from said first core to said second core comprising: a third core of magnetic material capable of assuming first and second stable states of flux remanence, an output winding on said first core, an input winding on said third core coupled to said output winding on said first core, a clock pulse winding on said third core, an output winding on said third core, and an input winding on said second core coupled to said output winding on said third core.

5. In a shifting register, first and second multistable magnetic cores each capable of assuming at least three stable states of flux remanence representative of information values, means coupling said multi-stable cores responsive to flux changes in said first core for controlling the transfer of information from said first core to said second core, comprising: a third core of magnetic material capable of assuming first and second limiting stable states of flux remanence, and winding means on said third core for applying thereto a magnetomotive force effective to drive said core from said first to said second stable state.

6. In a register, pulse means for supplying a first and second series of discrete clock pulses, said pulses in said first and second series being supplied in alternate time intervals, first and second multi-stable cores each capable of assuming first and second limiting states of flux remanence and a plurality of states of flux remanence intermediate said limiting states, input winding means on said first core coupled to said pulse means and responsive when one of said pulses in said first series is supplied by said pulse means to cause a flux change in said first core sufficient to step said core from one of said states of flux remanence to the next state in the direction of said second limiting state, an output winding on said first core, a third core of magnetic material capable of assuming first and second stable states of flux remanence, an input winding on said third core coupled to said output winding on said first core for conditioning said third core when said flux change is produced in said first core, an output winding on said third core, further winding means on said third core coupled to said pulse means for causing an output to be induced on said output winding on said third core when said pulse means supplies a pulse in said second series following said one pulse in said first series, input winding means on said second core, and means coupling said output winding means on said third core and said input winding means on said second core.

7. In a register, pulse means for supplying first and second series of clock pulses, said pulses in said first and second series being supplied during alternate time intervals, first and second storage devices each including a multistable magnetic core capable of assuming at least three information representing states of flux remanence, means coupling said pulse means to said first storage element for applying thereto a pulse in said first series and thereby causing an information pulse to be read out of said device, a bistable magnetic core device coupled to said first storage device and responsive to conditioning by said information pulse read out of said first storage device, means coupling said pulse means to said bistable core device for applying a pulse in said second series to said bistable core device, said pulse in said second series applied to said bistable core device being effective to cause said bistable device to produce an output pulse when previously conditioned by an information pulse read out of said first storage device, and means coupling said bistable core device and said second storage device controlled by said output pulse produced by said bistable device for applying an information pulse to said second storage device.

8. In a shifting register circuit, first and second cores of magnetic material each capable of being caused to assume first and second limiting states of flux remanence and a plurality of intermediate states of flux remanence representative of decimal information values, each of said cores being capable of being magnetized in step by step fashion from one of said limiting states through said intermediate states to the other of said limiting states, winding means on said first core for magnetizing said first core to a particular one of said intermediate states representative of a particular decimal value and thereafter reading out said value by magnetizing said first core in step by step fashion from said particular intermediate state to one of said limiting states, output winding means on said first core on which a number of outputs corresponding to said particular value stored in said first core are induced as said first core is magnetized in step by step fashion from said particular intermediate state to said one limiting state, third and fourth cores of magnetic material each capable of assuming first and second stable states of flux remanence in first and second directions and each in said first stable state, input winding means on said third core coupled to said output winding means on said first core for switching said third core to said second stable state in response to each of said outputs induced on said output winding on said first core, clock pulse means coupled to winding means on said third and fourth cores for applying thereto magnetizing impulse having a direction and magnitude to cause each of said third and fourth cores to be saturated in said first direction following each of said switching of said third core from said first to said second stable state, output winding means linking said third and fourth cores in opposite senses, and input winding means on said second core coupled to said last named output winding means for applying a quantified magnetizing impulse to said second core each time an output is induced on said output winding on said first core, whereby said second core is set at one of said intermediate states representative of said particular decimal value originally stored in said first core.

References Cited in the file of this patent

UNITED STATES PATENTS

| | | |
|---|---|---|
| 2,666,151 | Rajchman et al. | Jan. 12, 1954 |
| 2,777,098 | Duffing et al. | Jan. 8, 1957 |
| 2,886,801 | Briggs | May 12, 1959 |
| 2,925,958 | Polzin | Feb. 23, 1960 |

UNITED STATES PATENT OFFICE

CERTIFICATE OF CORRECTION

Patent No. 2,985,867 May 23, 1961

Donald D. Christensen et al.

It is hereby certified that error appears in the above numbered patent requiring correction and that the said Letters Patent should read as corrected below.

Column 5, line 34, strike out "to the upper"; same line 34, after the period insert a closing quotation mark; column 9, line 57, for "M1" read -- MS1 --.

Signed and sealed this 6th day of February 1962.

(SEAL)
Attest:

ERNEST W. SWIDER
Attesting Officer

DAVID L. LADD
Commissioner of Patents